3,001,442
Patented Sept. 26, 1961

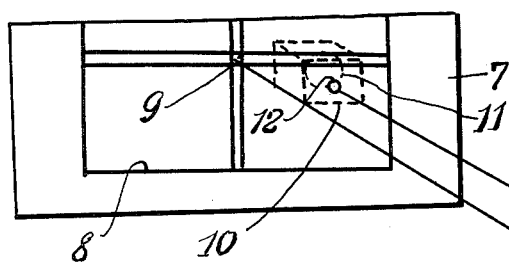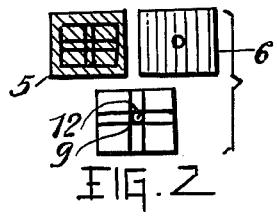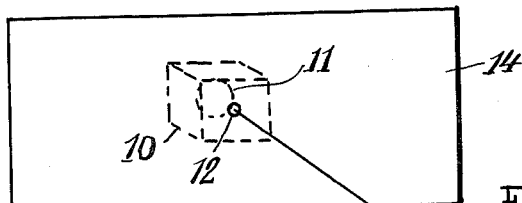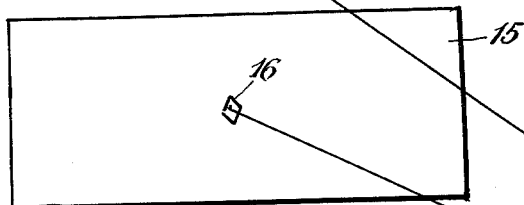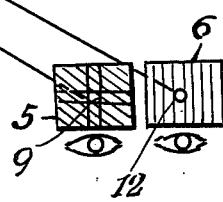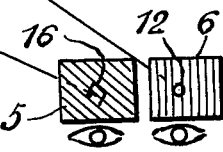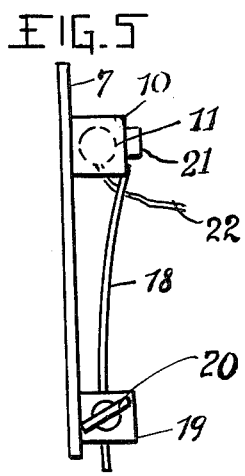

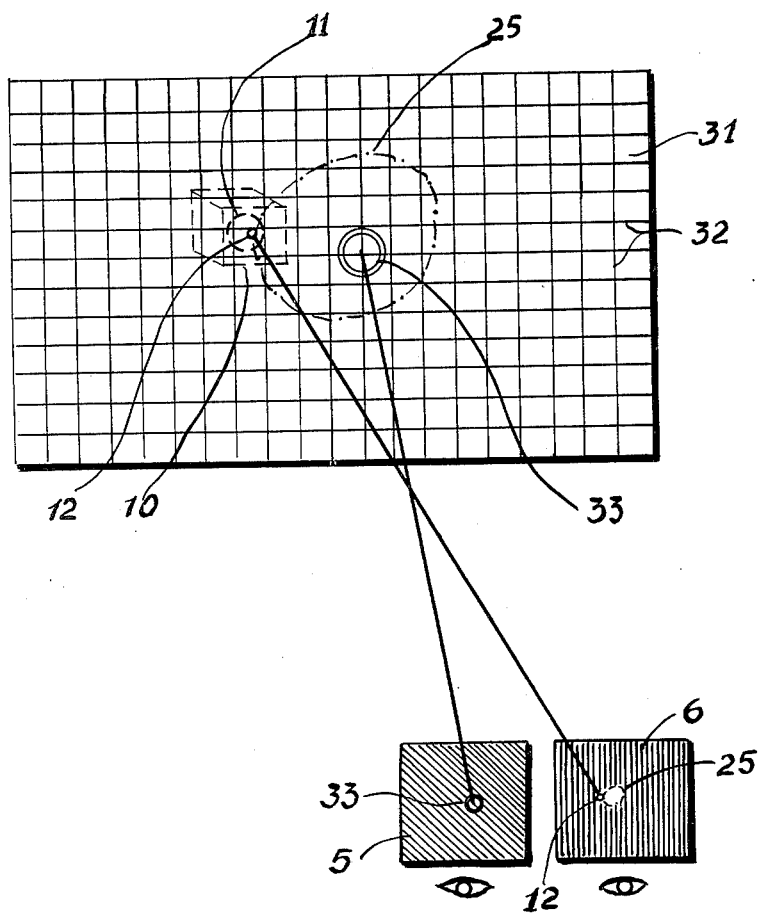

3,001,442
METHOD FOR MEASURING VISUAL DISCREPANCY
Frederick W. Brock, 39 Victory Blvd., Staten Island 1, N.Y.
Filed Oct. 16, 1959, Ser. No. 847,019
6 Claims. (Cl. 88—20)

My invention relates to measuring and testing eye coordination or the lack of eye coordination and in particular provides a method in which the eyes of an individual are placed in a condition of fusionless vision while a pair of test devices, each seen by a different eye of the individual, are utilized to test the adequacy of binocular posture, to ascertain the positions of blind spots in amblyopia of one eye and to locate other dioptric defects.

It has heretofore been the practice in measuring and testing eye coordination to employ a viewing screen generally having a white background on which red and green figures, i.e., test devices, are projected or otherwise marked in a manner such that the figures can be moved relative to one another. In accordance with this prior practice the individual whose eyes are being examined is provided with spectacles having colored lenses, one lens being colored red to act as a filter preventing the red figure from being seen through such lens and the other lens being colored green to act as a filter occluding the view of the green figure. Thus, the individual being examined sees only the green figure with his eye which has the red filter placed before it and sees only the red figure with his eye which has the green filter placed before it. Accordingly, there are theoretically no images seen by both eyes which are fusible and eye coordination of the individual is determined by moving the figures relative to each other till the red and green figures appear to be aligned. The method, however, is subject to the disadvantage that there are not presently available green filters which are capable of completely filtering out the green test device and hence, the green test device remains faintly visible to the eye having the green lens placed before it. Such a "shadow image" interferes with full dissociation of the images of the two test devices since they are fusible with "real" images.

It is a principal object of my invention to provide a simple method by which the necessity of employing a green test device can be eliminated and thus permit true fusionless vision during testing of eye coordination.

In accordance with the method of my invention, as in the prior practice, filters are placed before the eyes of the individual being examined, one filter being typically red and the other typically green. However, filters of other complementary colors can be employed. My method differs from the above discussed known methods in that instead of employing test devices of the same complementary colors, I employ test devices of one color which is the same color as one of the lenses employed by the individual being examined. Preferably, the test devices are red as the red filters available are extremely efficient. In accordance with my invention one of the test devices has an intensity of color that is darker than the background, while the other test device has an intensity brighter than the background. Thus, for example, where the test devices are red and the individual being examined is provided with spectacles or goggles having one red lens and one green lens, the eye of the individual which has the green lens before it sees only the darker red test device while the other eye which has the red lens before it sees only the brighter red test device. True fusionless vision is thereby obtained, and by moving the test devices relative to each other until they appear aligned to the individual being examined, any lack of eye coordination will be indicated by the actual separation of the test devices.

In employing the method of my invention, I have found it preferable to employ one of the test devices as a fixed target and to employ the other test device as a movable indicator which is moved, either by the person being examined or by a technician examining him, to a position at which it indicates an apparent alignment with the target. Generally, the darker colored test device is constructed by marking an object, such as a viewing screen, with red ink. Preferably the brighter colored test device is obtained by projecting red light either against an opaque background screen or through a translucent background screen. Where the darker, ink-mark, test device is employed as the target, that is, as a stationary fixation object, I prefer to mark the background screen directly with the red ink and employ a movable lamp to cast the indicator spot on the screen. Where, however, it is found more desirable to employ the spot cast by the lamp as the fixation object, it is preferable to employ a separate transparent plate on which the indicator device is an ink spot.

In another aspect of my invention, I have also found it possible to measure normal and pathological blind areas in an amblyopic eye while the other eye is used for fixation. Thus, preferably the darker red spot is used as the fixation object or target and the green filter lens is placed before the good eye of the individual being examined. In this case, however, rather than moving the indicator device, which is the projected light spot to bring it into apparent alignment with the fixation object or target, the indicator device, i.e., light spot cast by the lamp, is moved throughout the field of vision of the individual being examined to ascertain those areas in which the indicator device disappears from the vision of the amblyopic eye.

For a more complete understanding of the practical application of the principles of my invention, reference is made to the appended drawings in which:

FIGURE 1 is a diagrammatic illustration of an apparatus useful in carrying out the method of my invention;

FIGURE 2 is illustrative of the vision of the person being examined when utilizing the apparatus of FIGURE 1;

FIGURE 3 is a diagrammatic illustration of another apparatus useful in carrying out the method of my invention;

FIGURE 4 is illustrative of the vision of the person being examined when utilizing the apparatus of FIGURE 3;

FIGURE 5 is a side view of a portion of the apparatus shown in FIGURE 1; and

FIGURE 6 is a diagrammatic illustration of still another apparatus useful in carrying out the method of my invention.

Referring more particularly to FIGURES 1 and 5, the apparatus there shown includes a white translucent screen 7 which is mounted in vertical position. A box 10 is mounted on the rear of screen 7 such that it can be moved horizontally and vertically, under the control of the technician operating the apparatus, to any position on the rear of screen 7. A resilient support 18 slidably extending through a bearing 19 affixed adjacent the lower edge of screen 7 is drawn through bearing 19 to a position contacting the rear side of box 10 to hold it against the rear face of screen 7 at whatever position box 10 is moved by the technician. A thumb nut 20 is provided in bearing 19 such that it can be tightened down against support 18 to secure support 18 in any desired position.

Box 10, which suitably is provided with a handle 21 on its rear side, includes a red lamp bulb 11 and is provided with a small aperture on its side facing the rear of screen 7. The front face of screen 7, referring more particularly to FIGURE 1, is provided with a target test device 8 which includes a rectangular figure drawn in red ink on the surface of screen 7 including a pair of closely spaced centrally located vertical lines and a second pair of closely spaced centrally located horizontal lines forming a cross 9 within the rectangular area bounded by test device 8.

The apparatus employed further includes a pair of spectacles or goggles to be worn by the individual being examined. The spectacles are provided with one green filter lens 5 and one red filter lens 6.

In operation the individual being examined has the spectacles containing green filter lens 5 and red filter lens 6 placed before his eyes; for example lens 5 is placed before his left eye, and lens 6 is placed before his right eye. He is then positioned such that screen 7 is within his field of vision a predetermined distance from his eyes and in a plane perpendicular to his line of sight which should be centered on the center of cross 9. Lamp 11 is then illuminated to project the indicator test device 12 through the aperture in the forward face of box 10 as a spot of red light visible through translucent screen 7.

The individual being examined, referring more particularly to FIGURE 2, with his left eye sees through green filter lens 5 the target test device 8 including cross 9 as dark lines against a green background. With his right eye, the individual sees through red filter lens 6 only indicator test device 12 which appears as a brighter red spot against a less intense red background.

Target test device 8 including cross 9 which cannot be seen by the right eye functions as a fixation object. The individual's eye coordination is then determined by moving box 10 and hence indicator device 12 across the rear face of screen 7 until the indicator test device 12 appears to the individual being examined to be aligned with the center of cross 9. Thereby, the adequacy or inadequacy of eye coordination while the eyes are visually dissociated becomes known to the technician or doctor. If the red spot of light forming indicator test device 12 is in fact centered on cross 9 of target test device 8, the individual's eyes are coordinated. If indicator 12 is in fact not centered on cross 9 of target test device 8, the individual's eyes are not properly coordinated, and the displacement of device 12 from the center of cross 9 is a direct measure of the eye incoordination of the individual being examined.

This discrepancy is readily measured in the same manner as it has been done before with prior methods employing red and green test devices. Briefly, the horizontal and vertical displacements of the test devices are measured on screen 7 and then equated with the distance of the individual being examined from screen 7. Thus, if the individual is positioned one meter from screen 7, each centimeter of the vertical component of displacement is equal to one diopter of hypertropia, and each center of the horizontal component of displacement is equal to one diopter of lateral phoria. Measuring the displacement is conveniently done after test devices 9 and 12 are apparently aligned by the individual being examined by employing a ruler directly on screen 7 or by placing a grid including equal spaced horizontal and vertical lines marked on a transparent screen over the face of screen 7. Typically, the lines of the grid are spaced one centimeter to facilitate direct measurement in diopters in the case of a measuring distance of one meter. If different measuring distances are employed, of course, the spacing of the grid lines is appropriately changed.

Referring to FIGURE 3, essentially the same apparatus is shown except that an unmarked white translucent screen 14 is substituted for translucent screen 7 and box 10 is fixed in position such that the red spot showing on screen 14, which is test device 12, is now the target test device serving as a fixation object. In this arrangement, the indicator test device is a small diamond 16 marked in red ink on the center on a rectangular glass panel 15.

Screen 14 is placed in the field of vision of the individual being examined as before, preferably in vertical position with the target test device 12 centered horizontally before the individual's eyes. The individual being examined then takes plate 15 and places it in his field of vision between him and screen 14. At this point, referring to FIGURE 4, the individual sees through his left eye before which green filter lens 5 is placed only a pale green background formed by screen 14 and a darker diamond formed by indicator test device 16. With his right eye, before which red filter lens 6 is placed, the individual sees only a pale red background formed by screen 14 and a brighter red spot formed by target test device 12. The individual then moves glass plate 15 to align indicator test device 16 with target test device 12 as shown in FIGURE 4. Once in this position he then moves glass plate 15 nearer to screen 14 while holding the apparent aligned position of test devices 12 and 16. Upon contact of plate 15 with screen 14, the adequacy of binocular posture is again apparent by the displacement or the lack of displacement of indicator test device 16 from target test device 12, which displacement is measured as described above.

While I have above described the method of my invention as it is applied in measuring binocular posture, the method of my invention is also useful in measuring or plotting of blind spots in unilateral amblyopia. FIGURE 6 illustrates an arrangement of apparatus which is suitable in accomplishing this application of my method.

The apparatus includes essentially the same components as before except that another, white translucent screen 31 is substituted for screen 7. Screen 31 in this case is marked in red ink with equally spaced vertical and horizontal lines 32. Preferably, the spacing is equivalent to one degree in the field of vision of the individual being examined. Thus, for example, if the individual is to be positioned one meter from screen 31, lines 32 are spaced two centimeters. The target test device which forms the fixation object is a small circle 33 marked in red ink preferably at the center of screen 31 and centered on the intersection of a pair of vertical and horizontal lines 32. The individual being examined then has spectacles or goggles containing lenses 5 and 6 placed before his eyes with green filter lens 5 placed before his good eye, in the illustrated case his left eye, and with red filter lens 6 before his amblyopic eye, his right eye as illustrated. Lamp 11 is illuminated to project a red spot 12 visible from the front of screen 31 which forms the indicator test device. As before, indicator test device 12 appears to the individual being examined only through red filter lens 6 before his right, amblyopic eye as a bright red spot against a pale red background in which the fixation object, that is, target test device 33 and grid lines 32 are invisible. Similarly, as before, grid lines 32 and target test device 33 are apparent only to the left eye of the individual through green filter lens 5 as dark lines against a green background in which indicator test device 12 is invisible.

Box 10 is then moved to carry indicator test device 12 across each suspected blind area, such as a central blind spot 25 enclosing target test device 33, while the individual being examined fixates upon dark target 33. As the red spot forming indicator test device 12 is so moved, it will disappear from the view of the individual as it enters pathological blind spots of the amblyopic eye. The borders of the blind spots can conveniently be charted on screen 31 by the technician examining the individual utilizing red ink to mark the positions on screen 31 where the individual announces indicator test device 12 just disappears. Thus, when the entire area of screen 31 has been traversed, a complete map of the blind spots of the amblyopic eye will be obtained. Since the borders of the blind spots are marked in red ink, such markings are not visible to the amblyopic eye of the individual being examined. It will be apparent that this procedure constitutes a convenient, accurate method for plotting central scotomata (blind spots) which is much less time consuming than other presently used methods. I have found, moreover, that since the ink marks are difficult to remove from screen 31 without also removing lines 32 (which are also marked in red ink) that this difficulty can be conveniently avoided by placing a sheet of "reflectionless glass" directly over screen 31 while plotting the blind spots of the amblyopic eye. Thus, charting the blind spots is done directly on the sheet of reflectionless glass. After the examination, the location of the blind spots shown by the markings on the reflectionless glass can be conveniently located with reference to the grid lines 32 and tabulated. Thereafter, the ink marks employed to chart such blind spots can be removed from the reflectionless glass to ready the apparatus for further examination without interfering with grid lines 32.

Although I have described my invention employing a particular apparatus, it will be apparent that many variations and apparatus are possible. For example, box 10 can be substituted by a light projector located in front of the background screen in which case the screen need not be translucent. It is also feasible to project both test devices provided one device is less intense than the background and the other more intense than the background. It will be further apparent that while I have described my invention in its application to testing eyes, it is generally applicable where fusionless vision is required, for example in training eyes to correct deficiencies such as incoordination. It will also be apparent that where I speak of green as a complementary to red, I actually refer to a red-free color which has a blue-green cast.

This application is a continuation-in-part of application Serial No. 760,039, filed September 9, 1958, now abandoned.

I claim:

1. A method for inducing fusionless vision which includes placing a test device of a certain color having an intensity brighter than the background within the field of vision of an individual, placing a second test device having the same certain color of an intensity darker than the background within said field of vision of said individual, placing a light filter for said certain color before one eye of said individual, and placing a light filter for a color complementary to said certain color before the other eye of said individual, thereby said first named test device is visible only to said one eye of said individual and said second test device is visible only to the other eye of said individual and fusionless vision is induced.

2. A method for testing eye coordination which includes placing a test device of a certain color having an intensity brighter than the background within the field of vision of an individual, placing a second test device having the same certain color of an intensity darker than the background within said field of vision of said individual, placing a light filter for said certain color before one eye of said individual, placing a light filter for a color complementary to said certain color before the other eye of said individual, and moving said first and second test devices relative to each other to a position of apparent alignment in the field of vision of said individual.

3. A method of charting blind spots in unilateral amblyopia which includes placing a test device of a certain color having an intensity brighter than the background within the field of vision of an individual, placing a second test device having the same certain color of an intensity darker than the background within said field of vision of said individual, placing a light filter for said certain color before the amblyopic eye of said individual, placing a light filter for a color complementary to said certain color before the good eye of said individual, moving said first test device through the field of vision of said individual, and locating the positions at which said first test device disappears from the vision of said amblyopic eye.

4. A method according to claim 1 in which said certain color is red and in which said complementary color is green.

5. A method according to claim 2 in which said certain color is red and in which said complementary color is green.

6. A method according to claim 3 in which said certain color is red and in which said complementary color is green.

References Cited in the file of this patent

UNITED STATES PATENTS

| | | |
|---|---|---|
| 938,463 | Cogan | Nov. 2, 1909 |
| 1,780,291 | Cameron | Nov. 4, 1930 |
| 1,899,135 | Cameron | Feb. 28, 1933 |
| 2,238,207 | Ames | Apr. 15, 1941 |